US008563128B2

(12) United States Patent
Göthlich et al.

(10) Patent No.: US 8,563,128 B2
(45) Date of Patent: Oct. 22, 2013

(54) PREPARATION FOR AND METHOD OF APPLYING CORROSION CONTROL COATS

(75) Inventors: Alexander Göthlich, Mannheim (DE); Guido Vandermeulen, Ilvesheim (DE); Konrad Roschmann, Ludwigshafen-Edigheim (DE); Gerhard Fischer, Dirmstein (DE); Helmut Witteler, Wachenheim (DE); Monica Fernandez Gonzalez, Frankenthal (DE)

(73) Assignee: BASF SE (DE)

( * ) Notice: Subject to any disclaimer, the term of this patent is extended or adjusted under 35 U.S.C. 154(b) by 880 days.

(21) Appl. No.: 11/814,758

(22) PCT Filed: Jan. 24, 2006

(86) PCT No.: PCT/EP2006/050416
§ 371 (c)(1),
(2), (4) Date: Jul. 14, 2008

(87) PCT Pub. No.: WO2006/079629
PCT Pub. Date: Aug. 3, 2006

(65) Prior Publication Data
US 2009/0029155 A1    Jan. 29, 2009

(30) Foreign Application Priority Data

Jan. 28, 2005 (DE) .......................... 10 2005 004 292
Dec. 20, 2005 (DE) .......................... 10 2005 061 318

(51) Int. Cl.
*B32B 15/08* (2006.01)
*C08L 31/06* (2006.01)
*B05D 3/00* (2006.01)

(52) U.S. Cl.
USPC ........... 428/336; 428/332; 428/458; 427/327; 427/331; 427/372.2; 524/559

(58) Field of Classification Search
None
See application file for complete search history.

(56) References Cited

U.S. PATENT DOCUMENTS

| | | | |
|---|---|---|---|
| 4,530,955 A | 7/1985 | Wilson et al. | |
| 4,761,488 A * | 8/1988 | Fried | 549/255 |
| 6,090,894 A | 7/2000 | Schimmel et al. | |
| 6,348,528 B1 | 2/2002 | Schlarb et al. | |
| 6,646,082 B2 * | 11/2003 | Ghosh et al. | 526/262 |
| 6,777,096 B2 * | 8/2004 | Shiba et al. | 428/463 |
| 7,008,998 B2 * | 3/2006 | Tazzia et al. | 524/800 |
| 7,655,279 B2 * | 2/2010 | Dietsche et al. | 427/388.1 |
| 2004/0024135 A1 * | 2/2004 | Verge et al. | 525/327.6 |

FOREIGN PATENT DOCUMENTS

| | | |
|---|---|---|
| CA | 990 060 | 6/1976 |
| EP | 0 122 229 A1 | 10/1984 |
| EP | 0 157 133 B1 | 10/1985 |
| EP | 0 244 584 B1 | 11/1987 |
| EP | 247728 A1 * | 12/1987 |
| EP | 1 288 232 A2 | 3/2003 |
| EP | 1 288 338 A1 | 3/2003 |
| JP | 60-024384 | 2/1985 |
| JP | 60-219267 | 11/1985 |
| JP | 2004-068065 | 3/2004 |
| JP | 2004-204243 | 7/2004 |
| JP | 2004-204244 | 7/2004 |
| JP | 2004-218050 | 8/2004 |
| JP | 2004-218051 | 8/2004 |
| WO | WO-99/29790 A1 | 6/1999 |
| WO | WO-99/46337 A1 | 9/1999 |

OTHER PUBLICATIONS

Müller, B. et al., "Amphiphilic copolymers as corrosion inhibitors for zinc pigment," *Corrosion Science*, 2000, pp. 577-584, 42, Elsevier Science Ltd., Esslingen, Germany.

Müller, B. et al., "Styrol-Maleinsäure-Copolymere als Korrosionsinhibitoren für Aluminiumpigmente in wäßrigen Medien," *Chemie*, 1994, pp. 177-185, 221.

* cited by examiner

*Primary Examiner* — Monique Jackson
(74) *Attorney, Agent, or Firm* — Novak Druce Connolly Bove + Quigg LLP

(57) ABSTRACT

Preparation for and a method of applying corrosion control coats to metallic surfaces, particularly the surfaces of metallic structures or metal constructions, the preparation comprising at least one binder system curable under atmospheric conditions, a dicarboxylic acid-olefin copolymer, and a finely divided filler, pigment or dye. Coated metallic surface obtainable by means of the method, especially the surface of metallic structures or metal constructions.

22 Claims, 1 Drawing Sheet

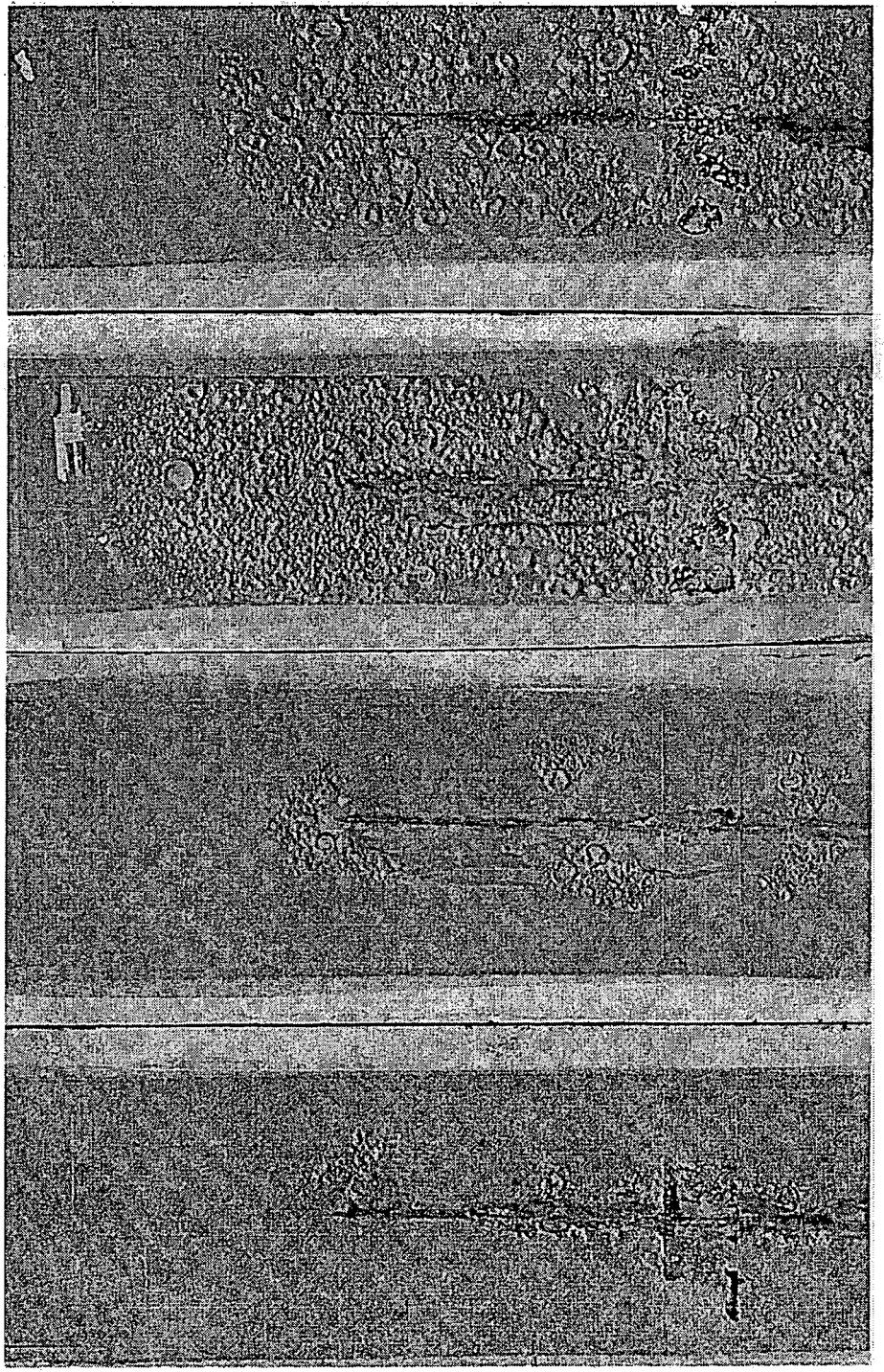

PREPARATION FOR AND METHOD OF APPLYING CORROSION CONTROL COATS

CROSS REFERENCE TO RELATED APPLICATIONS

This application is a National Phase of International Application No. PCT/EP2006/050416 filed on Jan. 24, 2006, which claims priority to Application No. 102005004292.9 filed in Germany on Jan. 28, 2005, which claims priority to Application No. 102005061318.7 filed in Germany on Dec. 20, 2005 under 35 U.S.C. §119; the entire contents of all are hereby incorporated by reference.

The present invention relates to a preparation for and a method of applying corrosion control coats to metallic surfaces, especially the surfaces of metallic structures or metal constructions, the preparation comprising at least one binder system curable under atmospheric conditions, a dicarboxylic acid-olefin copolymer, and a finely divided filler, a pigment or a dye. It additionally relates to a coated metallic surface obtainable by means of the method.

Metallic articles, components, structures or metal constructions made from usual metallic materials must in general be protected from corrosion. An important position in corrosion control is occupied here by coatings which shield the metallic surface from the effects of corrosive media. Suitable corrosion control coating systems typically comprise one or more binders, anticorrosion pigments, organic corrosion inhibitors if appropriate, and further adjuvants and additives.

For sheetlike metallic workpieces such as, for example, metal panels or coils, or else for shaped but movable metallic workpieces, such as automobile bodies or bodywork parts, for example, corrosion control coatings can be applied on industrial lines. The drying and curing are performed typically at relatively high temperatures, such as in suitable ovens, for example, or else may be performed photochemically using suitable radiation sources.

In the case of stationary metallic constructions such as buildings, bridges, power masts, oil tanks, pipelines, power stations or chemical plant, for example, the corrosion control coatings cannot of course be applied in the manner described, but instead are usually applied in situ by brushing or spraying. The drying and curing of corrosion control coatings of this kind are accomplished under atmospheric conditions, and hence at ambient temperature and in the presence of air and usual atmospheric humidity.

The corrosion control needed for surfaces depends on the locally prevailing corrosion exposure. Depending on the degree of control required, the control of corrosion on surfaces by means of corrosion control coatings is also termed light, medium and heavy duty corrosion control. Heavy duty corrosion control must afford adequate protection even in cases of severe corrosion exposure, such as industrial atmosphere, damp atmosphere and/or salt-containing atmosphere, for example.

In the case of severe corrosion exposures it is therefore usual to apply a primer coating, an intermediate coating and a top coating to the metallic surface. The primer coating comprises corrosion preventatives and/or anticorrosion pigments and so makes a decisive contribution to the corrosion control function. Furthermore, it ensures adequate adhesion between the metallic surface and subsequent coatings. The intermediate coating acts in particular as a barrier coat. For this purpose it may comprise, for example, leaflet-shaped pigments. The principal purpose of the top coating is to protect the coating system from environmental effects such as rain, moisture, UV light, airborne contaminants, chemicals, dust or bird droppings, and of course it serves decorative purposes. Typical recommended thicknesses of corrosion control coatings are situated, depending on the nature of the coating, at between 15 and 500 μm.

Each time it becomes necessary to renew a corrosion control coating, the application of three coats not only entails considerable cost and inconvenience for the removal of the old coating and the application of the new coating but may in addition mean that plant or buildings cannot be utilized during renovation.

One of the most effective anticorrosion pigments for corrosion control coatings is zinc chromate. For environmental reasons, however, the market is increasingly demanding chromium-free corrosion control coatings, particularly those free from chromium (VI). Typical substitutes, such as zinc phosphates, however, are generally less effective than zinc chromate.

There is therefore demand for a chromium-free, more effective corrosion control which allows the time until retreatment of the surface is required to be extended. Furthermore, it is desirable to provide coating systems for which the number of coatings required can be reduced, so that at the very least only one primer coating and one top coating are necessary for effective corrosion control, or even just a single coat, taking on the function of all three coats together.

Binders for preparing coating materials for corrosion control coatings are known in principle.

EP-A 157 133 discloses a binder composition for aqueous corrosion control coatings, which comprises an aqueous dispersion of poly(meth)acrylate copolymers and also zinc complex salts of polymeric polycarboxylic acids. The formulations may also comprise corrosion inhibitors and also anticorrosion pigments. Polymeric corrosion inhibitors are not disclosed.

WO 99/46337 discloses an aqueous polymer dispersion, for example comprising alkyl (meth)acrylates, vinyl esters or vinylaromatics, in conjunction with an emulsifier containing phosphate groups, and also discloses its use as a binder for paints or corrosion control coating materials. Polymeric corrosion inhibitors are not disclosed.

The use of various olefin-maleic acid copolymers as corrosion preventatives is known in principle.

Müller et al. disclose in "Corrosion Science, 2000, 42, 577-84" and also in "Die Angewandte Makromolekulare Chemie 1994, 221, 177-85" the use of styrene-maleic acid copolymers as corrosion preventatives for zinc pigments and/or aluminum pigments.

EP-A 122 229, CA 990 060, JP 60-24384, and JP-A 2004-68065 disclose the use of copolymers of maleic acid and also various other monomers such as styrene, other olefins and/or other vinyl monomers as corrosion preventatives in aqueous systems.

EP-A 244 584 discloses the use of copolymers of modified maleic acid units and styrene, sulfonated styrene, alkyl vinyl ethers, $C_2$ to $C_6$ olefins and also (meth)acrylamide as an addition to cooling water. The modified maleic acid units have functional groups—attached via spacers—such as, for example, —OH, —OR, —$PO_3H_2$, —$OPO_3H_2$, —COOH or, preferably, —$SO_3H$.

JP-A 2004-204243 and JP-A 2004-204244 disclose steel sheets of improved solderability, which are aftertreated first with tin, then with zinc, and subsequently with an aqueous formulation, for the purpose of improving solderability. The aqueous formulation comprises 100 to 800 g/l of water-based acrylate resin, 50 to 600 g/l of water-soluble rosins, 10 to 100 g/l of a corrosion preventative and 1 to 100 g/l of antioxidants. In an alternative embodiment of the invention, the formulation comprises 100-900 g/l of a water-based polyurethane resin, 10 to 100 g/l of a corrosion preventative and also 1 to 100 g/l of antioxidants. Corrosion preventatives which can be employed include amines and also styrene-maleic anhydride copolymers. Preference is given to using a polymer which comprises the ammonium salt of a maleic monoester as a polymer unit. The formulations comprise no fillers or pigments. The coats are dried at 90° C. The thickness of the coating is 0.05 to 10 μm in each case. JP-A 2004-218050 and also JP-2004-218051 disclose corresponding formulations and also steel sheets coated therewith, the formulations, in that case additionally comprising water-dispersible $SiO_2$.

JP-A 60-219 267 discloses a radiation-curable coating formulation which comprises 5% to 40% of a copolymer of styrene and also unsaturated dicarboxylic acids and/or their monoesters, 5% to 30% of phenolic resins, and 30% to 90% of monomeric acrylates. By means of the coating material it is possible to obtain rustproofing films which can be removed by alkali and have a thickness of 5 to 50 μm.

EP-A 1 288 232 and EP-A 1 288 338 disclose copolymers of modified maleic acid units and other monomers such as, for example, acrylates, vinyl ethers or olefins. The modified maleic acid units are N-substituted maleiamides and/or maleimides. The N-substituents are heterocyclic compounds attached via spacers. The publications disclose the use of polymers of this kind as corrosion preventatives in aqueous systems, such as cooling water circuits, for example, and also as an ingredient for aqueous corrosion control coatings. For corrosion control coatings they can be formulated with typical paint ingredients.

WO 99/29790 discloses compounds which comprise heterocycles having at least two secondary nitrogen atoms. These compounds are used as crosslinkers for curing epoxy coating materials at temperatures below 40° C. The publication mentions corrosion control coatings for construction-grade steel with a coat thickness of 112 to 284 μm. The nitrogen compounds can, among others, be copolymers of N-substituted maleimide units and styrene or 1-octene. The maleimide units are substituted by a piperazine unit attached via a spacer.

U.S. Pat. No. 6,090,894 discloses OH-functionalized copolymers and their use for preparing coating materials for coating metals or plastics. The OH-functional copolymers are obtained by polymer-analogous reaction of epoxy compounds with COOH-containing copolymers of maleic monoesters or diesters and α-olefincarboxylic acids and also, if appropriate, further monomers. The maleic monoesters or diesters are esters with monofunctional alcohols, especially methanol or ethanol. In the case of epoxy compounds, those involved may be, for example, glycidyl compounds, ethylene oxide or, preferably, propylene oxide.

It was an object of the invention to provide an improved method of applying corrosion control coatings featuring longer service lives. Additionally the intention was to reduce the number of corrosion control coats to be applied. The method ought preferably to be a chromium-free method.

Found accordingly has been a preparation for applying corrosion control coats to metallic surfaces which comprises at least the following components:
(A) 15% to 70% by weight of at least one binder system (A) curable under atmospheric conditions,
(B) 0.1% to 40% by weight of at least one polymeric corrosion preventative,
(C) 5% to 83.9% by weight of at least one solvent,
(D) 1% to 70% by weight of at least one component (D) selected from the group of finely divided fillers, pigments or dyes, the amounts each being based on the total amount of all the components of the formulation, wherein the corrosion preventative is at least one copolymer (B) synthesized from the following monomeric structural units:
(b1) 70 to 30 mol % of at least one monoethylenically unsaturated hydrocarbon (b1a) and/or of at least one monomer (c1b) selected from the group of monoethylenically unsaturated hydrocarbons (b1b'), modified with functional groups $X^1$, and vinyl ethers (b1b"),
(b2) 30 to 70 mol % of at least one monoethylenically unsaturated dicarboxylic acid having 4 to 8 C atoms and/or its anhydride (b2a) and/or derivatives (b2b) thereof,
the derivatives (b2b) being esters of the dicarboxylic acid with alcohols of the general formula HO—$R^1$—$X^2_n$(I) and/or amides or imides with ammonia and/or amines of the general formula $HR^2N$—$R^1$—$X^2_n$(II), and the abbreviations having the following definition:
$R^1$: (n+1)-valent hydrocarbon group having 1 to 40 C atoms, in which nonadjacent C atoms may also be substituted by O and/or N,
$R^2$: H, $C_1$ to $C_{10}$ hydrocarbon group or —($R^1$—$X^2_n$)
n: 1, 2 or 3
$X^2$: a functional group; and also
(b3) 0 to 10 mol % of other ethylenically unsaturated comonomers, different from (b1) and (b2) but copolymerizable with (b1) and (b2),
the amounts each being based on the total amount of all the monomer units in the copolymer.

In a second aspect of the invention a method of corrosion control has been found which involves applying at least one corrosion control coat having a thickness of at least 15 μm to a metallic surface, the method comprising at least the following steps:
(1) applying a preparation curable under atmospheric conditions to the bright or precoated metallic surface, and
(2) curing the applied coat under atmospheric conditions.

In a third aspect of the invention a coated surface obtainable in accordance with the method has been found.

Details of the invention now follow:

By means of the method of the invention it is possible in principle to coat all varieties of metals. Those in question, however, are preferably base metals or alloys which are typically employed as metallic materials of construction and require protection from corrosion.

The surfaces in question are in particular those of iron, steel, zinc, zinc alloys, aluminum or aluminum alloys. Steel may comprise the usual alloying components known to the skilled worker. The surfaces in question may be those of bodies composed entirely of the stated metals and/or alloys. Alternatively they may be the surfaces of bodies coated with Zn, Zn alloys, Al or Al alloys, it being possible for the bodies to be composed of other materials, such as of other metals, alloys, polymers or composites, for example. In one preferred embodiment of the invention the surfaces in question are of steel or of galvanized and/or aluminized steel.

Zinc alloys or aluminum alloys are known to the skilled worker. Typical constituents of zinc alloys comprise, in particular, Al, Pb, Si, Mg, Sn, Cu or Cd. Typical constituents of aluminum alloys comprise, in particular, Mg, Mn, Si, Zn, Cr, Zr, Cu or Ti. The term "zinc alloy" is also intended to include Al/Zn alloys in which Al and Zn are present in approximately equal amount. It is the desired end use that governs the skilled worker's selection of the type and amount of alloying ingredients. Zn coatings or aluminum coatings can be applied to steel by means, for example, of hot-dip methods, such as hot-dip galvanizing, or by Sherardizing. Where the component is stationary or its geometry does not allow it, corresponding coats can also be applied by means of thermal spraying (spray galvanizing, spray aluminizing).

The method of the invention can be used in particular to provide corrosion control for metallic surfaces which in the course of their use are in contact with atmospheric air, although the surfaces involved may also be those which in the course of use are in contact with water, soil or other corrosive media.

The metallic surfaces to be protected from corrosion by means of the method of the invention may in principle be any desired surfaces. With preference, however, they are the surfaces of metallic structures or metal constructions and/or their required components. Metal constructions and structures are typically connected from construction-grade steel, such as steel girders, steel pipes or steel panels, by riveting, welding or screwing, to form corresponding constructions. Examples comprise bridges, power masts, tanks, containers, chemical plant, buildings, roofs, pipes, couplings, flanges, ships, cranes, posts or bulkheads.

With particular preference the method of the invention can be used to protect metallic surfaces which are subject to corrosion exposure of categories C2 (in accordance with DIN EN ISO 12944) or higher, preferably categories C3 or higher, and more preferably categories C4 or higher.

These corrosiveness categories in accordance with DIN EN ISO 129441 are defined by the mass loss per unit area of thickness reduction of unalloyed steel or for zinc whose surfaces have been subjected for 12 months to a defined corrosive exposure.

| | | |
|---|---|---|
| C2 (low corrosivity): | unalloyed steel: | mass loss >10-200 g/m$^2$ thickness decrease >1.3-25 μm |
| | zinc: | mass loss >0.7-5 g/m$^2$ thickness decrease >0.1-0.7 μm |
| C3 (medium corrosivity): | unalloyed steel: | mass loss >200-400 g/m$^2$ thickness decrease >25-50 μm |
| | zinc: | mass loss >5-15 g/m$^2$ thickness decrease >0.7-2.1 μm |
| C4 (high corrosivity): | unalloyed steel: | mass loss >400-650 g/m$^2$ thickness decrease >50-80 μm |
| | zinc: | mass loss >15-30 g/m$^2$ thickness decrease >2.1-4.2 μm |
| C5-I/M (very high): | unalloyed steel: | mass loss >650-1500 g/m$^2$ thickness decrease >80-200 μm |
| | zinc: | mass loss >30-60 g/m$^2$ thickness decrease >4.2-8.4 μm |

The method of the invention is preferably a chromium (VI)-free method, more preferably a chromium-free method. The term "chromium (VI)-free" or "chromium-free" in the context of this invention means that the preparation employed does not itself comprise any chromium (VI) compounds or, respectively, any chromium compounds at all, and that, in addition, no corrosion-inhibiting pretreatment of the metal surface with chromium (VI) compounds or chromium compounds, respectively, is carried out either. It would be appreciated that this does not rule out the possibility of traces of chromium being located—unintentionally per se—in the coat. These may, for example, be chromium traces leached from the steel during the coating of a steel containing chromium.

The method of the invention for corrosion control is performed in accordance with the invention using a preparation which comprises at least one binder system (A) curable under atmospheric conditions, at least one polymeric corrosion preventative (B), at least one solvent (C), and also at least one finely divided filler and/or pigment (D).

Binder (A)

The binder systems (A) curable under atmospheric conditions may be the binder systems typical in the field of corrosion control coatings. Binders or binder systems of this kind are known in principle to the skilled worker. It will be appreciated that mixtures of different binder systems can also be employed, provided that mixing does not give rise to any unwanted effects.

The term "binder system" refers below, in a way which is known in principle, to those components of the formulation that are responsible for the formation of a film.

The term "curable under atmospheric conditions" means that the binder systems have the capacity, following application to the surface under typical ambient conditions, i.e., approximately at room temperature, in the presence of air and also typical atmospheric humidity, to cure without the use of additional apparatus or equipment. Typical curing temperatures, depending on the environment, are more than 0 to 40° C., preferably 5 to 35° C., and, for example, 15 to 25° C. It is clear to the skilled worker that the time to complete curing of an individual binder system may differ according to the ambient conditions actually prevailing.

Curing may proceed by a variety of mechanisms, depending on the nature of the binder system employed. By way of example the curing involved may be purely physical curing, produced by the evaporation of the solvent used. It may also be an oxidative curing through reaction of the binder system with the oxygen in the air. Finally, it may also be a chemical crosslinking (reactive crosslinking). Reactive binder systems comprise crosslinkable components. The crosslinkable components may be of low molecular mass, oligomeric or polymeric. The systems in question may be preferably one-component (1 K) or else two-component (2 K) systems. Reactively crosslinking systems also comprise moisture-curing binder systems, where the atmospheric moisture functions as a curing component. It would be appreciated that a binder system may also cure through a combination of different curing methods. In the case of 2 K systems the binder component and curing component are mixed, in a way which is known in principle, before the formulation is used.

The invention can be performed using aqueously soluble or organically soluble binder systems. Preference is given to binder systems on an aqueous basis.

Binder systems for corrosion control coatings, especially corrosion control systems on an aqueous basis, are known in principle to the skilled worker. They may for example be epoxy resins, polyacrylates, styrene-acrylate polymers, polyesters, alkyd resins, polyurethanes or styrene-butadiene polymers.

The amount of binders (A) in the formulation is 15 to 70% by weight, based on the amount of all the components of the formulation, including the solvent. It is set by the skilled worker in accordance with the desired properties of the coating. The amount is preferably 20% to 60% by weight and more preferably 25% to 50% by weight.

Preferred binder systems for performing the inventions are described below.

Polyacrylates or Styrene-Acrylate Copolymers (A1)

In one preferred embodiment of the invention the binder system is an aqueous or predominantly aqueous dispersion of polyacrylates or styrene-acrylate copolymers (A1).

Aqueous dispersions of polyacrylates or styrene-acrylate copolymers (A1) for preparing corrosion control coatings are known in principle to the skilled worker. The aqueous dispersions of the polyacrylates (A1) may be either primary dispersions or secondary dispersions. Suitable polyacrylates comprise as principal monomers at least one alkyl (meth)acrylate such as, for example, methyl (meth)acrylate, ethyl (meth) acrylate, butyl (meth)acrylate or 2-ethylhexyl (meth)acrylate. They can have preferably as further principal monomers vinylaromatics, especially styrene. The amount of the principal monomers together is in general at least 60% by weight, preferably at least 80% by weight. Styrene-acrylate copolymers comprise in addition to the stated alkyl (meth)acrylates as principal monomer in general at least 30% by weight, preferably at least 40% by weight, and more preferably about 50% by weight of styrene. The polyacrylates or stryrene-acrylate copolymers (A1) may additionally have further comonomers as well, particularly those containing functional groups such as hydroxyl, carboxyl or carboxamide groups. Examples comprise (meth)acrylic acid, itaconic acid, maleic acid, fumaric acid, (meth)acrylamide or hydroxyalkyl (meth) acrylates. Further comonomers are preferably acidic comonomers. In addition it is also possible, optionally, for crosslinking monomers to be present as well in small amounts, typically less than 4% by weight, preferably less than 2% by weight. Examples comprise butanediol (meth) acrylate, hexanediol di(meth)acrylate or allyl acrylate.

Polyacrylates (A1) can be prepared in a way which is known in principle by means of a emulsion polymerization. Further details of such polymers and of their preparation are disclosed for example in EP-A 157 133, WO 99/46337, or in "Paints and Coatings, 2.5. Acrylic Coatings" in Ullmann's Encyclopedia of Technical Chemistry, 6th Edition 2000, Electronic Release. The skilled worker makes an appropriate selection from the polyacrylates (A1) possible in principle, in accordance with the desired properties of the coat.

Especially suitable for performing the invention are styrene-acrylate copolymers which comprise as principal monomers at least one elastomeric acrylate such as, for example, n-butyl (meth)acrylate, n-hexyl (meth)acrylate, n-octyl, acrylate or 2-ethylhexyl (meth)acrylate in a mixture with styrene and also, as secondary monomer, at least one acidic monomer, such as (meth)acrylic acid, for example. For use as binders for the formulation it is possible for some or all of the acid groups to be neutralized with suitable bases, such as ammonia.

The polyacrylates employed ought in general to have a glass transition temperature, $T_g$, in the range from 0 to 60° C., preferably in the range from 5 to 40° C. (measured by the DSC method in accordance with DIN EN ISO 11357). The glass transition temperature may be chosen by the skilled worker, in a way which is known in principle, through the selection and the proportion of hard monomers and soft monomers.

With preference for performing the invention it is possible additionally to use polyacrylates (A1) having an average particle size of 50 nm to 400 nm, more preferably 80 nm to 250 nm (measured with the Malvern® Autosizer 2 C).

Suitable acrylate dispersions and styrene-acrylate dispersions for preparing corrosion control coatings are available commercially, as for example Acronal® S 760 or Acronal® LR 8977 (BASF Aktiengesellschaft) or Acronal® Optive 410 (BASF Corporation).

Styrene-Alkadiene Polymers (A2)

In a second, preferred embodiment of the invention the binder system is an aqueous or predominantly aqueous dispersion of styrene-alkadiene polymers (A2).

Aqueous dispersions of styrene-alkadiene polymers (A2) for preparing corrosion control coatings are known in principle to the skilled worker and described for example in EP-A 47380. They may preferably be primary dispersions or else secondary dispersions.

Suitable polymers (A2) comprise as principal monomers styrene and also at least one conjugated aliphatic diene (alkadiene). The alkadienes may be, for example, butadiene, isoprene, 1,3-pentadiene or dimethylbutadiene. The styrene may also be substituted by alkyl groups. Examples comprise α-methylstyrene or 4-methylstyrene. The principal monomers are preferably styrene and butadiene. In general the polymers comprise at least 20% by weight styrene and 20% by weight alkadienes, the amount of the principal monomers together being in general at least 60% by weight, preferably at least 80% by weight. The quantities are based in each case on the sum of all the monomers. They may additionally have further comonomers as well. Here mention may be made, on the one hand, of ethylenically unsaturated carboxylic and/or dicarboxylic acids such as (meth)acrylic acid, maleic acid or itaconic acid. Additionally the comonomers may be ethylenically unsaturated carbonitriles such as (meth)acrylonitrile and also alkyl (meth)acrylates such as methyl (meth)acrylate, n-butyl (meth)acrylate, n-hexyl (meth)acrylate, n-octyl acrylate or 2-ethylhexyl (meth)acrylate.

Styrene-alkadiene polymers (A2) can be prepared in a way which is known in principle by means of emulsion polymerization. Further details of styrene-butadiene polymers for coating materials and also of their preparation are disclosed for example in "Paints and Coatings, 2.4.8. Polystyrene and Styrene Copolymers" in Ullmann's Encyclopedia of Technical Chemistry, 6th Edition 2000, Electronic Release.

Particularly suitable for performing the invention are styrene-butadiene polymers which comprise as a secondary monomer one or more acidic monomers, such as (meth) acrylic acid, preferably in an amount of 0.5% to 5% by weight. For use as binders for the formulation it is possible with preference for some or all of the acid groups to be neutralized with suitable bases, such as ammonia.

The styrene-butadiene polymers (A2) employed ought in general to have a glass transition temperature $T_g$ in the range from 0 to 60° C., preferably in the range from 5 to 40° C. The glass transition temperature can be chosen by the skilled worker in a way which is known in principle through the selection and the proportion of hard monomers and soft monomers.

Preferably for performing the invention it is possible in addition to use styrene-butadiene polymers (A2) having an average particle size of 50 nm to 400 nm, more preferably 80 nm to 250 nm (measured as above).

Polyurethanes (A3)

In a third, preferred embodiment of the invention the binder system is an aqueous or predominantly aqueous dispersion of polyurethanes (A3).

Aqueous dispersions of polyurethanes (A3) for preparing corrosion control coatings are known in principle to the skilled worker. Details of polyurethanes for coating materials and also of their preparation are disclosed for example in "Paints and Coatings, 2.9 Polyurethane Coatings" in Ullmann's Encyclopedia of Technical Chemistry, 6th Edition 2000, Electronic Release. The aqueous dispersions of the polyurethanes (A3) may be either primary dispersions or secondary dispersions.

Polyurethanes for aqueous dispersions can be synthesized, in a way which is known in principle, from customary diisocyanates and also diols. With a view to effective film formation and good elasticity, diols particularly suitable for this purpose are those having a number-average molecular weight, $M_n$ of about 500 to 5000 g/mol, preferably about 1000 to 3000 g/mol. For this purpose it is possible to use both polyether diols and polyester diols. The amount of such diols of relatively high molecular weight is typically 10 to 100 mol % relative to the sum of all the diols. The desired hardness and elasticity of the film can be controlled by using, in addition to the diol already mentioned, low molecular weight diols having a number-average molecular weight $M_n$ of about 60 to 500 g/mol.

For the synthesis of polyurethanes for aqueous dispersions use is made, furthermore, of monomers which comprise at least one isocyanate group or one group which is reactive toward isocyanate groups, and also, additionally, at least one hydrophilic group. These may be nonionic groups such as polyoxyethylene groups, acidic groups such as COOH, sulfonate or phosphonate groups, or basic groups such as amino groups, for example. With preference they are acidic groups. For use as binders for the formulation it is possible with preference for all or some of the acid groups to be neutralized with suitable bases. Preferred for this purpose are ammonia or amines. Further details on such polyurethane dispersions and also their preparation are described at length in WO 2005/005565, page 4 line 13 to page 14 line 14. Further examples of suitable polyurethanes are disclosed in U.S. Pat. No. 5,707,941 or in WO 2004/101638, especially page 2 line 31 to page 14 line 11.

The polyurethanes may also have been modified. By way of example, the compounds in question may be oxidatively curing urethane alkyds. For the preparation it is possible to subject, for example, triglycerides of unsaturated fatty acids to partial hydrolysis. The resultant OH group is able to react with the isocyanate groups in the course of polyurethane preparation.

With preference for performing the invention it is possible additionally to use polyurethanes (A3) having an average particle size of not more than 1000 nm, preferably less than 500, more preferably less than 200 nm, and in particular 20 to 200 nm.

Alkyd Resins (A4)

In a fourth, preferred embodiment of the invention the binder system is an aqueous or predominantly aqueous dispersion of alkyd resins (A4).

Aqueous dispersions of alkyd resins (A4) for preparing corrosion control coatings are known in principle to the skilled worker. Alkyd resins (A4) are oxidatively curing polycondensation resins of polyols and polybasic carboxylic acids, in which at least one OH group of the polyol is esterified with fatty oils and/or with natural and/or synthetic mono- or polyunsaturated fatty acids, it being necessary for at least one of the polyols employed to have a functionality of three or more.

Examples of preferred polyhydric alcohols comprise glycerol, pentaerythritol, trimethylolethane, trimethylolpropane, various diols such as ethanediol/propanediol, diethylene glycol and neopentyl glycol.

Preferred polybasic carboxylic acids are phthalic acid (anhydride) (PAn), isophthalic acid, terephthalic acid, trimellitic anhydride, adipic acid, azelaic acid, sebacic acid; phthalic acid (anhydride) is particularly preferred.

Examples of suitable oil components or fatty acids include drying oils, such as linseed oil, oiticica oil or tung oil, semidrying oils, such as soybean oil, sunflower oil, safflower oil, ricinine oil or tall oil, nondrying oils, such as castor oil, coconut oil or peanut oil, or free fatty acids of above oils.

The molar mass $M_n$ of typical alkyd resins is between 1500 and 20 000 g/mol, preferably between 3500 and 6000 g/mol. The acid number is preferably 2 to 30 mg KOH/g, or else 35-65 mg KOH/g in the case of water-dilutable resins. The OH number is generally up to 300, preferably up to 100 mg KOH/g.

The term "alkyd resins" is also intended to comprise modified alkyd resins such as styrene-modified alkyd resins, urethane alkyds, urethane oils or epoxy resin-modified alkyd resins. Modified alkyd resins of this kind are known to the skilled worker.

Further details of alkyd resins (A4) for coating materials and also of their preparation are disclosed for example in "*Paints and Coatings, 2.6. Alkyd Coatings*" in Ullmann's Encyclopedia of Technical Chemistry, 6th Edition 2000, Electronic Release, and also in "*Lackformulierung und Lackrezeptur*" [Paint Formulation and Paint Formula], edited by Ulrich Zoril, p. 188 ff., Curt R. Vinzentz Verlag, Hanover, 2003.

The alkyd resins (A4) employed ought in general to have a glass transition temperature $T_g$ in the range from 0 to 60° C., preferably from 5 to 40° C.

Copolymer (B)

In accordance with the invention the composition further comprises as corrosion preventative at least one copolymer (B). The copolymer is synthesized from the monomers (b1) and (b2) and also, optionally, (b3), it being possible of course in each case to employ two or more different monomers (b1) and/or (b2) and/or (b3). Other than (b1), (b2), and, if desired, (b3) there are no other monomers present.

Monomers (b1)

Monomers (b1) employed are 70 to 30 mol % of at least one monoethylenically unsaturated hydrocarbon (b1a) and/or of at least one monomer (b1b) selected from the group of monoethylenically unsaturated hydrocarbons (b1b'), modified with functional groups $X^1$, and also monoethylenically unsaturated ethers (b1b"). The quantity figure is based on the total amount of all monomer units in the copolymer.

(b1a)

The monomers (b1a) may in principle be all hydrocarbons which contain an ethylenically unsaturated group. These may be straight-chain or branched aliphatic hydrocarbons (alkenes) and/or alicyclic hydrocarbons (cycloalkenes). They may also be hydrocarbons which besides the ethylenically unsaturated group contain aromatic radicals, especially vinylaromatic compounds. Preference is given to ethylenically unsaturated hydrocarbons in which the double bond is located in α position. As a general rule at least 80% of the monomers (b1a) employed ought to have the double bond in a position.

The term "hydrocarbons" is also intended to comprise oligomers of propene or of unbranched or, preferably, branched $C_4$ to $C_{10}$ olefins which have an ethylenically unsaturated group. Oligomers employed generally have a number-average molecular weight $M_n$ of not more than 2300 g/mol. Preferably $M_n$ is 300 to 1300 g/mol and more, preferably 400 to 1200 g/mol. Preference is given to oligomers of isobutene, which may optionally further comprise additional $C_3$ to $C_{10}$ olefins as comonomers. Oligomers of this kind that are based on isobutene will be referred to below, following general usage, as "polyisobutene". Polyisobutenes employed ought preferably to have an α-double bond content of at least 70%, more preferably at least 80%. Polyisobutenes of this kind— also referred to as reactive polyisobutenes—are known to the skilled worker and are available commercially.

Apart from the stated oligomers, suitable monomers (b1a) for performing the present invention include, in particular, monoethylenically unsaturated hydrocarbons having 6 to 30 C atoms. Examples of such hydrocarbons comprise hexene, heptene, octene, nonene, decene, undecene, dodecene, tetradecene, hexadecene, octadecene, eicosane, docosane, diisobutene, triisobutene or styrene.

Preference is given to using monoethylenically unsaturated hydrocarbons having 9 to 27, more preferably 12 to 24 C atoms and, for example, 18 to 24 C atoms. It will be appreciated that mixtures of different hydrocarbons can also be used.

These may also be technical mixtures of different hydrocarbons, examples being technical $C_{20-24}$ mixtures.

As monomer (b1a) it is particularly preferred to use alkenes, preferably 1-alkenes having the aforementioned numbers of C atoms. The alkenes are preferably linear or at least substantially linear. "Substantially linear" is intended to denote that any side groups present are only methyl or ethyl groups, preferably only methyl groups.

Also particularly suitable are the stated oligomers, preferably polyisobutenes. Surprisingly it is possible by this means specifically to improve the processing properties in aqueous systems. The oligomers, however, are used preferably not as sole monomer but instead in a mixture with other monomers (b1a). It has been found appropriate not to exceed an oligomer content of 60 mol % in relation to the sum of all monomers (b1). If present, the amount of oligomers is in general 1 to 60 mol %, preferably 10 to 55, and more preferably 20 to 50 mol %, and, for example, about 20 mol %. Suitability for combination with polyisobutenes is possessed in particular by olefins having 12 to 24 C atoms.

(b1b')

The monoethylenically unsaturated hydrocarbons (b1b') modified with functional groups $X^1$ may in principle be all hydrocarbons which have an ethylenically unsaturated group and in which one or more H atoms of the hydrocarbon have been substituted by functional groups $X^1$.

These may be alkenes, cycloalkenes, or alkenes containing aromatic radicals. Preferably they are ethylenically unsaturated hydrocarbons in which the double bond is located in α position. In general the monomers (b1b') have 3 to 30 C atoms, preferably 6 to 24 C atoms, and more preferably 8 to 18 C atoms. They preferably have one functional group $X^1$. The monomers (b1b') are preferably linear or substantially linear α-unsaturated-ω-functionalized alkenes having 3 to 30, preferably 6 to 24, and more preferably 8 to 18 C atoms, and/or 4-substituted styrene.

With the functional groups $X^1$ it is possible with advantage to influence the solubility of the copolymer (B) in the formulation and also the anchoring to the metal surface and/or in the binder matrix. Depending on the nature of the binder system and of the metallic surface the skilled worker makes an appropriate selection of functional groups. The functional groups are preferably at least one selected from the group of —Si(OR$^3$)$_3$ (with $R^3$=$C_1$ to $C_6$ alkyl), —OR$^4$, —SR$^4$, —NR$^4_2$, —NH(C=O)R$^4$, COOR$^4$, —(C=O)R$^4$, —COCH$_2$COOR$^4$, —(C=NR$^4$)R$^4$, —(C=N—NR$^4_2$)R$^4$, —(C=N—NR$^4$, —(C=O)—NR$^4_2$)R$^4$, —(C=N—OR$^4$)R$^4$, —O—(C=O)NR$^4$, —NR$^4$(C=O)NR$^4_2$, —NR$^4$(C=NR$^4$)NR$^4$, —CSNR$^4_2$, —CN, —PO$_2$R$^4_2$, —PO$_3$R$^4_2$, —OPO$_3$R$^4_2$, (with $R^4$=independently at each occurrence H, $C_1$ to $C_6$ alkyl, aryl, alkali(ne earth) metal salt) or —SO$_3$H.

With particular preference the groups $X^1$ are Si(OR$^3$)$_3$ (with $R^3$=$C_1$ to $C_6$ alkyl), —OR$^4$, —NR$^4_2$, —NH(C=O)R$^4$, COOR$^4$, —CSNR$^4_2$, —CN, —PO$_2$R$^4_2$, —PO$_3$R$^4_2$, —OPO$_3$R$^4_2$, (with $R^4$=independently at each occurrence H, $C_1$ to $C_6$ alkyl, aryl, alkali(ne earth) metal salt) or —SO$_3$H. Very particular preference is given to —COOH.

Examples of suitable monomers (b1b') comprise $C_4$ to $C_{20}$ (α,ω)-ethenylcarboxylic acids, such as vinylacetic acid or 10-undecenecarboxylic acid, for example, $C_2$ to C20 (α,ω)-ethenylphosphonic acids such as vinylphosphonic acid, for example, its monoester or diesters or salts, $C_3$ to $C_{20}$ ethenylcarbonitriles such as acrylonitrile, allylnitrile, 1-butenenitrile, 2-methyl-3-butenenitrile, 2-methyl-2-butenenitrile, 1-, 2-, 3- or 4-pentenenitrile or 1-hexenenitrile, or 4-substituted styrenes such as 4-hydroxystyrene or 4-carboxystyrene. It will be appreciated that mixtures of two or more different monomers (b1b') can also be used. Preferably (b1b') is 10-undecenecarboxylic acid.

(b1b")

The vinyl ethers (b1b") are, in a way which is known in principle, ethers of the general formula H$_2$C=CH—O—R$^6$, in which $R^6$ is a straight-chain, branched or cyclic, preferably aliphatic hydrocarbon group having 1 to 30 C atoms, preferably having 2 to 20 C atoms, and more preferably 6 to 18 C atoms. The vinyl ethers in question may also be modified vinyl ethers in which one or more H atoms in the group $R^6$ have been substituted by functional groups $X^1$, where $X^1$ is as defined above. $R^6$ is preferably a linear or substantially linear group, with functional groups $X^1$ present optionally being located preferably terminally. It will be appreciated that two or more different vinyl ethers (b1b") may also be employed.

Examples of suitable monomers (b1b") comprise 1,4-dimethylolcyclohexane monovinyl ether, ethylene glycol monovinyl ether, diethylene glycol monovinyl ether, hydroxybutyl vinyl ether, methyl vinyl ether, ethyl vinyl ether, butyl vinyl ether, cyclohexyl vinyl ether, dodecyl vinyl ether, octadecyl vinyl ether or tert-butyl vinyl ether.

To prepare the inventively used copolymers (C) it is possible to employ only the monomers (b1a) or only the monomers (b1b) or else a mixture of monomers (b1a) and (b1b). Preference is given to only monomers (b1a) or to a mixture of (b1a) and (b1b). In the case of a mixture of (b1a) and (b1b), preference is given to a mixture of (b1a) and (b1b'). In the case of a mixture the amount of monomers (b1b) is generally 0.1 to 60 mol % in relation to the sum of all monomers (b1), preferably 1 to 50 mol %, and more preferably 5 to 30 mol %.

Monomers (b2)

As monomers (b2) use is made in accordance with the invention of 30 to 70 mol % of at least one monoethylenically unsaturated dicarboxylic acid having 4 to 8 C atoms and/or anhydrides thereof (b2a) and/or derivatives thereof (b2b). The quantity figure refers to the total amount of all-monomer units in the copolymer (B).

(b2a)

Examples of monoethylenically unsaturated dicarboxylic acids (b2a) comprise maleic acid, fumaric acid, citraconic acid, mesaconic acid, itaconic acid, methylenemalonic acid or 4-cyclohexene-1,2-dicarboxylic acid. The monomers may also be salts of the dicarboxylic acids and also—where possible—cyclic anhydrides thereof. A preferred monomer (b1a), is maleic acid and/or maleic anhydride.

(b2b)

The derivatives (b2b) of the monoethylenically unsaturated dicarboxylic acids are esters of the dicarboxylic acids with alcohols of the general formula HO—R$^1$—X$^2_n$ (I) and/or amides or imides with ammonia and/or amines of the general formula HR$^2$N—R$^1$—X$^2_n$ (II). Preference is given in each case to 1,ω-functional alcohols and amines, respectively.

In these formulae $X^2$ is any functional group. With the functional groups $X^2$ as well it is possible with advantage to influence the solubility of the copolymer (B) in the formulation and also the anchoring to the metal surface and/or in the binder matrix. The skilled worker makes an appropriate selection of functional groups in accordance with the nature of the binder system and of the metallic surface. The groups in question may for example be acidic groups or groups derived from acidic groups. In particular the functional group may be one selected from the group of —Si(OR$^3$)$_3$ (with $R^3$=$C_1$ to $C_6$ alkyl), OR$^4$, —SR$^4$, —NR$^4_2$, —NH(C=O)R$^4$, COOR$^4$, —(C=O)R$^4$, —COCH$_2$COOR$^4$, —(C=NR$^4$)R$^4$, —(C=N—NR$^4_2$)R$^4$, —(C=N—NR$^4$—(C=O)—NR$^4_2$)R$^4$, —(C=N—OR$^4$)R$^4$, —O—(C=O)NR$^4$, —NR$^4$(C=O)

$-NR^4{}_2$, $-NR^4(C=NR^4)NR^4$, $-CSNR^4{}_2$, $-CN$, $-PO_2R^4{}_2$, $-PO_3R^4{}_2$, $-OPO_3R^4{}_2$, (with $R^4$=independently at each occurrence H, $C_1$ to $C_6$ alkyl, aryl, alkali(ne earth) metal salt) or $-SO_3H$. Preferably it is $-SH$, $-CSNH_2$, $-CN$, $-PO_3H_2$ or $-Si(OR^3)_3$ and/or salts thereof, and very preferably $-CN$ or $-CSNH_2$.

The number n of the functional groups $X^2$ in (I) or (II) is generally 1, 2 or 3, preferably 1 or 2, and more preferably (I).

In the formulae (I) and (II) $R^1$ is an (n+1)-valent hydrocarbon group having 1 to 40 C atoms which join the OH group and/or the $NHR^2$ group to the functional group or groups $X^2$. In the group it is also possible for nonadjacent C atoms to be substituted by O and/or N. The group in question here is preferably a 1,ω-functional group.

In the above formulae (I) and (II) $R^2$ is H, a $C_1$ to $C_{10}$ hydrocarbon group, preferably a $C_1$ to $C_6$ alkyl group, or a group $-R^1-X^2{}_n$, with $R^1$ and $X^2{}_n$ being as defined above. Preferably $R^2$ is H or methyl and more preferably it is H.

In the case of divalent linking groups $R^1$ the groups in question are preferably linear 1,ω-alkylene radicals having 1 to 20, preferably 2 to 6 C atoms. Particular preference is given to 1,2-ethylene, 1,3-propylene, 1,4-butylene, 1,5-pentylene or 1,6-hexylene radicals. With further preference the groups in question may be groups which have O atoms, examples being $-CH_2-CH_2O-CH_2-CH_2-$ or polyalkoxy groups of the general formula $-CH_2-CHR^7-[-O-CH_2-CHR^7-]_m-$, where m is a natural number from 2 to 13 and $R^7$ is H or methyl. Examples of compounds (I) and (II) with linking groups $R^1$ of this kind comprise $HO-CH_2-CH_2-CSNH_2$, $HO-CH_2-CH_2-SH$, $H_2N-CH_2-CH_2-CH_2-Si(OCH_3)_3$, $H_2N-(-CH_2-)_6-CN$, $H_2N-CH_2-CH_2-OH$ or $H_2N-CH_2-CH_2-O-CH_2-CH_2-OH$.

If the radical is intended to bond two or more functional groups, it is possible in principle for two or more functional groups to be bonded to the terminal C atom. In this case, however, $R^1$ preferably has one or more branches. The branch may involve a C atom or, preferably, an N atom. Examples of compounds (II) having such a radical are (hydroxyethyl)aminobismethylenephosphonic acid (IIa) or (aminoethyl)aminobismethylenephosphonic acid (IIb).

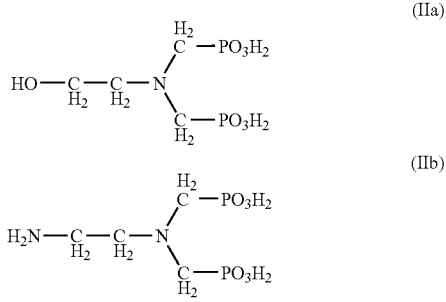

The derivatives (b2b) of the dicarboxylic acids may in each case have both COOH groups of the dicarboxylic acid esterified or amidated with the compounds (I) and/or (II), respectively. Preferably, however, only one of the two COOH groups in each case is esterified or amidated. An imide may naturally be formed only with 2 COOH groups in common. These are preferably two adjacent COOH groups; of course, however, they may also be nonadjacent COOH groups.

Monomers (b3)

The copolymers (B) used in accordance with the invention may further comprise, as structural units, 0 to 10 mol %, preferably 0 to 5 mol %, more preferably 0 to 3 mol % of other ethylenically unsaturated monomers which are different from (b1) and (b2) but copolymerizable with (b1) and (b2). Monomers of this kind may be used—if necessary—to fine-tune the properties of the copolymer. With very particular preference no monomers (b3) are comprised.

Examples of monomers (b3), comprise, in particular, (meth)acrylic compounds such as (meth)acrylic acid or (meth)acrylic esters or hydrocarbons having conjugated double bonds such as butadiene or isoprene. The (meth)acrylic esters may also contain further functional groups, such as OH or COOH groups, for example. Additionally the monomers in question may also be monomers which have a crosslinking action, having two or more isolated ethylenically unsaturated double bonds. The copolymers ought not, however, to be too greatly crosslinked. If crosslinking monomers are present, their amount ought in general not to exceed 5 mol % with respect to the sum of all the monomers, preferably 3 mol % and more preferably 2 mol %.

The quantities of the monomers (b1), (b2), and (b3) to be used in accordance with the invention have already been given. The quantities of (b1) are preferably 35 to 65 mol % and those of (b2) 65 to 35 mol %; with particular preference (b1) is 40 to 60 mol % and (b2) is 60 to 40 mol %; and with very particular preference (b1) is 45 to 55 mol % and (b2) is 55 to 45 mol %. By way of example the quantity of (b1) and (b2) may in each case amount to approximately 50 mol %.

Preparation of the Copolymers (B)

The preparation of the copolymers (B) used in accordance with the invention is performed preferably by means of free-radical polymerization of the monomers. The conduct of a free-radical polymerization, including required apparatus, is known in principle to the skilled worker. The polymerization is preferably carried out using thermally decomposing polymerization initiators. With preference it is possible to use peroxides as thermal initiators. The polymerization can of course also be performed photochemically.

As monomers (b2a) use is made preferably—where chemically possible—of the cyclic anhydrides of the dicarboxylic acids. Particular preference is given to using maleic anhydride.

Solvents which can be used include, preferably, aprotic solvents such as toluene, xylene, aliphatics, alkanes, benzine or ketones. Where long-chain monoethylenically unsaturated hydrocarbon monomers are employed which have a relatively high boiling point, especially those having a boiling point of more than about 150° C., it is also possible to operate without solvents. In that case the unsaturated hydrocarbons themselves act as solvents.

The free-radical polymerization with thermal initiators can be performed at 60-250° C., preferably 80-200° C., more preferably at 100-180° C., and in particular at 130 to 170° C. The quantity of initiator is 0.1% to 10% by weight relative to the quantity of the monomers, preferably 0.2% to 5% by weight, and with particular preference 0.5% to 2% by weight. Generally speaking a quantity of approximately 1% by weight is advisable. The polymerization time is typically 1-12 h preferably 2-10 h, and very preferably 4-8 h. The copolymers can be isolated from the solvent by methods known to the skilled worker or alternatively are obtained directly in solvent-free form.

Where the copolymers are not reacted further to give the derivatives (b2b), anhydride groups present are generally hydrolyzed to form the corresponding dicarboxylic acid units. The procedure is guided in this case judiciously by the intended use of the copolymer.

Where the copolymer is to be used in an aqueous binder system, it is advisable to perform the hydrolysis in water. For this purpose the copolymer containing anhydride groups can be introduced into water and hydrolyzed, judiciously with gentle heating and with addition of a base. Temperatures of up to 100° C. have been found appropriate. Suitable bases include, in particular, tertiary amines such as dimethylethanolamine, for example. The amount of base is generally 0.1-2 equivalents (based on dicarboxylic anhydride units in the polymer), preferably 0.5 to 1.5 equivalents, and more preferably 0.7-1.2 equivalents. Typically the amount of base used is approximately one equivalent per anhydride group. The resulting aqueous solution or dispersion of the copolymer can be employed directly for preparing the inventive preparation for the process. Of course, however, the copolymers, can also be isolated by methods known in principle to the skilled worker.

If the copolymer is to be employed in a binder system based on organic solvents, it can be dissolved or dispersed in an organic solvent such as THF, dioxane or toluene, for example, and water can be added in stoichiometrically required amounts, and also the base can be added. The hydrolysis may take place as described above with gentle heating. Alternatively is also possible, following hydrolysis in water, to perform a solvent exchange.

Copolymers which comprise derivatives of monoethylenically unsaturated dicarboxylic acids (b2b) can be prepared in principle by two different synthesis pathways. On the one hand it is possible to employ the derivatives (b2b) as monomers for the actual polymerization. These monomers may be prepared beforehand in a separate synthesis step from the functional alcohols (I) and/or the functional amines (II) and also the dicarboxylic acids or, preferably, their anhydrides.

In one preferred embodiment of the inventions first copolymers are prepared, as described above, from the monomers (b1) and also the non-derivatized ethylenically unsaturated dicarboxylic acids (b2a). Preferably the dicarboxylic acids for this purpose are used—where possible—in the form of their internal anhydrides, particular preference being given to the use of maleic anhydride. After the copolymer has formed it is possible with this synthesis variant to react the copolymerized dicarboxylic acid units, preferably the corresponding dicarboxylic anhydride units, and more preferably the maleic anhydride units, in a polymer-analogous reaction with the functional alcohols $HO-R^1-X^2_n$ (I) and/or ammonia and/or the functional amines $HR^2N-R^1-X^2$ (II).

The reaction may be performed in bulk (without solvent) or, preferably, in a suitable aprotic solvent. Examples of suitable aprotic solvents comprise, in particular, polar aprotic solvents such as acetone, methyl ethyl ketone (MEK), dioxane or THF and also, if appropriate, nonpolar hydrocarbons such as toluene or aliphatic hydrocarbons.

For the reaction the non-modified copolymer can for example be introduced into the reaction vessel in a solvent, and subsequently the desired functional alcohol $HO-R^1-X^2_n$ (I), ammonia or the desired functional amine $HR^2N-R^1-X^2$ (II) can be added in the desired quantity. The reagents for the functionalization may advantageously be dissolved beforehand in a suitable solvent. The derivatization is preferably carried out with heating. Reaction times which have been found appropriate are 2 to 25 h. When using primary amines or ammonia, at temperatures of up to 100° C., the corresponding amides are obtained preferentially, whereas increasingly, at higher temperatures, imides are formed as well. At 130 to 140° C. the formation of imides is already predominant. With preference the formation of imide structures ought to be avoided.

The quantities of the reagents used for the functionalization are guided by the desired degree of functionalization. A quantity which has been found appropriate is from 0.5 to 1.5 equivalents per dicarboxylic acid unit, preferably 0.6 to 1.2, more preferably 0.8 to 1.1, and very preferably about 1 equivalent. If less than 1 equivalent is used, remaining anhydride groups may be opened hydrolytically in a second step.

It is of course also possible to use mixtures of two or more functional alcohols $HO-R^1-X^2_n$ (I) and/or ammonia, or the functional amines $HR^2N-R^1-X^2$ (II), respectively. Also possible are reaction sequences in which reaction takes place first of all with an alcohol/ammonia/amine and after that reaction a further alcohol/ammonia/amine component is used for reaction.

The organic solutions of the modified copolymers that are obtained can be used directly to formulate organic crosslinkable preparations. It will be appreciated that it is also possible, however, to isolate the polymers from these solutions, by methods known to the skilled worker.

For incorporation into aqueous formulations, water can be added appropriately to the solution and the organic solvent can be separated off by means of methods known to the skilled worker.

It is also possible for some or all of the acidic groups of the polymer to be neutralized. The pH of the copolymer solution ought in general to be at least 6, preferably at least 7, in order to ensure sufficient solubility or dispersibility in water. In the case of nonfunctionalized copolymers this figure corresponds approximately to one equivalent of base per dicarboxylic acid unit. In the case of functionalized copolymers the functional groups $X^1$ or $X^2$ of course affect the solubility properties of the copolymer. Examples of suitable bases for neutralizing comprise ammonia, alkali metal and alkaline earth metal hydroxides, zinc oxide, linear, cyclic and/or branched, $C_1$-$C_8$ mono-, di-, and trialkylamines, linear or branched $C_1$-$C_8$ mono-, di- or trialkanolamines, especially mono-, di- or trialkanolamines, linear or branched $C_1$-$C_8$ alkyl ethers of linear or branched $C_1$-$C_8$ mono-, di- or trialkanolamines, oligoamines and polyamines such as diethylenetriamine, for example. The base can be used subsequently or, with advantage, actually during the hydrolysis of anhydride groups.

The molecular weight $M_w$ of the copolymer is chosen by the skilled worker in accordance with the desired end use. An $M_w$ of 1000 to 100 000 g/mol has been found appropriate, preferably 1500 to 50 000 g/mol, more preferably 2000 to 20 000 g/mol, very preferably 3000 to 15 000 g/mol, and, for example, 8000 to 14 000 g/mol.

To produce the inventively used preparations it is possible to use a single copolymer (B) or else two or more different copolymers (B). From among those copolymers (B) which are possible in principle the skilled worker will make a specific selection in accordance with the desired properties of the corrosion control coat. For the skilled worker it is obvious that not all kinds of copolymers (B) are equally suitable for all kinds of binder systems, solvents or surfaces.

The inventively used copolymers (B) are employed in an amount of 0.1% to 40% by weight, preferably 0.2% to 20% by weight, and more preferably 0.5% to 10% by weight, based in each case on the amount of all the components of the formulation.

Solvents (C)

As component (C) the preparation comprises a suitable solvent. Suitable solvents are those capable of dissolving, dispersing, suspending or emulsifying the inventively used components, in order to allow uniform application of the preparation to the surface. They may be organic solvents or water. As will be appreciated, mixtures of different solvents are also possible.

Examples of organic solvents comprise hydrocarbons such as toluene, xylene or, in particular, mixtures of defined-boiling-range hydrocarbons, as obtained in the refining of crude oil, ether such as THF or polyethers such as polyethylene glycol, ether alcohols such as butyl glycol, ether glycol acetates such as butyl glycol acetate, ketones such as acetone and alcohols such as methanol, ethanol or propanol.

The solvent is preferably water or a predominantly aqueous solvent mixture. By such is meant mixtures of the kind which comprise at least 75%, preferably at least 85%, more preferably at least 90% and very preferably at least 95% by weight of water.

Further components of predominantly aqueous solvent mixtures may be water-miscible solvents. Examples comprise, in particular, typical cosolvents such as n-butanol, butyl glycol, butyl diglycol, N-methyl-2-pyrrolidone or N-ethyl-2-pyrrolidone. Further components may also, however, be water-immiscible solvents. Solvents of this kind are frequently used as film-forming assistants. Examples comprise butyl glycol acetate, butyl glycol diacetate or 2,2,4-trimethyl-1,3-pentanediol 1-isobutyrate (Texanol®).

The amount of the solvent or solvent mixture is 5% to 83.9% by weight with respect to the sum of all the components of the formulation. The amount is determined by the skilled worker in accordance with the desired properties of the coating formulation. The amount is preferably 10% to 74.8% by weight, more preferably 20% to 64.5% by weight, and, for example, 30% to 50% by weight.

Filler/Pigment/Dye (D)

The inventively used preparation further comprises at least one component (D) selected from the group of finely divided fillers, pigments or dyes.

The finely divided filler is generally an inorganic filler. Fillers and/or pigments may of course comprise an additional organic coating, for the purpose of hydrophobicization or hydrophilicization, for example.

The filler ought not to exceed an average particle size of 10 μm. With preference the average particle size is 10 nm to 8 μm, with particular preference 100 nm to 5 μm, and, for example, 2 to 4 μm. In the case of round or approximately round particles, this figure refers to the diameter; in the case of particles of irregular shape, such as with needle-shaped particles, for example, it refers to the longest axis. By particle size is meant the primary particle size. The skilled worker is aware of course that finely divided solids frequently undergo agglomeration into larger particles, which for use must be dispersed intensively. The particle size is chosen by the skilled worker in accordance with the desired properties of the coat.

The pigments may in particular be anticorrosion pigments. These may include both active and passive anticorrosion pigments.

Examples of active anticorrosion pigments comprise, in particular, phosphates, phosphate-containing or modified phosphates such as pigments based on zinc phosphate, zinc aluminum orthophosphate, zinc molybdenum orthophosphate, zinc aluminum molybdenum orthophosphate, calcium hydrogen phosphate, zinc calcium strontium orthophosphate silicate, zinc aluminum polyphosphate, strontium aluminum polyphosphate, zinc calcium aluminum strontium orthophosphate polyphosphate silicate and calcium aluminum polyphosphate silicate. Further examples comprise combinations of inorganic phosphates with electrochemically active organic corrosion inhibitors of low solubility, such as zinc phosphate modified with Zn salts or Ca salts of 5-nitroisophthalic acid. In addition it is also possible to use iron phosphide, zinc hydroxyphosphide, borosilicate pigments such as barium metaborate or zinc borophosphates, molybdates such as zinc molybdate, sodium zinc molybdates or calcium molybdate, pigments having ion exchange properties such as amorphous $SiO_2$ modified with calcium ions, or correspondingly modified silicates, metal oxides, such as ZnO, or else metal powders, such as zinc dust. It will be appreciated that typical organic anticorrosion pigments can also be used, such as Zn salts or Ca salts of 5-nitroisophthalic acid, for example.

Passive anticorrosion pigments prolong the diffusion pathways for corrosive components and thereby increase the corrosion resistance. Examples comprise, in particular, platelet-shaped or lamelliform pigments such as mica, hematite, phyllosilicates, linear polysilicates such as wollastonite, talc or metal platelets such as aluminum platelets or iron platelets.

Further details on anticorrosion pigments are disclosed for example in "*Pigments*, 4.2 *Anticorrosive Pigments*" in Ullmann's Encyclopedia of Technical Chemistry, 6th Edition 2000, Electronic Release.

The pigments may also be typical color pigment and/or effect pigment.

By effect pigments are meant all pigments which exhibit a platelet-shaped construction and impart specific decorative color effect to a surface coating. Effect pigments are known to the skilled worker. Examples comprise straight metal pigments, such as aluminum, iron or copper pigments, interference pigments, such as titanium dioxide-coated mica, iron oxide-coated mica, mixed oxide-coated mica (with titanium dioxide and $Fe_2O_3$, for example), metal oxide-coated aluminum, or liquid-crystal pigments.

Color pigments are, in particular, typical organic or inorganic absorption pigments that can be used in the paint industry. Examples of organic absorption pigments are azo pigments, phthalocyanine pigments, quinacridone pigments, and pyrrolopyrrole pigments. Examples of inorganic absorption pigments are iron oxide pigments, titanium dioxide, and carbon black.

Examples of dyes are azo, azine, anthraquinone, acridine, cyanine, oxazine, polymethine, thiazine and triarylmethane dyes. These dyes may find application as basic or cationic dyes, mordant dyes, direct dyes, disperse dyes, ingrain dyes, vat dyes, metal complex dyes, reactive dyes, acid dyes, sulfur dyes, coupling dyes or substantive dyes.

Fillers can be used to influence the properties of the coating, such as, for example, hardness, rheology or the orientation of the effect pigments. Fillers are frequently coloristically inactive; in other words, their inherent absorption is low and the refractive index is similar to that of the coating medium. Examples of fillers comprise talc, calcium carbonate, kaolin, barium sulfate, magnesium silicate, aluminum silicate, crystalline silicon dioxide, amorphous silica, aluminum oxide, microbeads or hollow microbeads made for example of glass, ceramic or polymers and having sizes of 0.1-10 μm for example. As fillers it is additionally possible to use any desired solid inert organic particles, such as urea-formaldehyde condensation products, micronized polyolefin wax or micronized amide wax. The inert fillers may each also be used in a mixture. Preferably, however, only one filler is employed in each case.

The components (D) are used in an amount of 1% to 70% by weight. The precise amount is set by the skilled worker in accordance with the desired properties of the coat. The amount is preferably 5% to 60% by weight and more preferably 10% to 50% by weight.

When using pigments and/or fillers it has been found appropriate to have pigment volume concentrations (PVCs) of 15% to 40%, preferably 20% to 40%, and more preferably 20% to 35% by volume, without any intention that the invention should be restricted thereto.

The nature and amount of components (D) are determined by the skilled worker in accordance with the end use for the coat. In one particularly preferred embodiment of the invention no chromium-containing components (D) are employed. It will be appreciated that mixtures of different components (D) can also be employed.

Preparations intended for priming are typically more highly pigmented than preparations intended for intermediate coating or top coating.

Preparations intended for priming typically comprise at least one active anticorrosion pigment; those intended for intermediate coatings, at least one passive anticorrosion pigment; and those for top coatings at least one color pigment and/or one dye.

In one particularly preferred embodiment, preparations intended for priming comprise at least one active anticorrosion pigment, at least one filler, and also, preferably, at least one color pigment.

Further Components (E)

Beyond components (A) to (D) it is also possible for the preparation used in accordance with the invention to comprise one or more auxiliaries and/or additives (E). Such auxiliaries and/or additives serve to fine-tune the properties of the coat. Their amount does not, as a general rule, exceed 20% by weight with respect to the sum of all the components bar the solvents, preferably not 10%.

Examples of suitable additives comprise rheological assistants, UV absorbers, light stabilizers, free-radical scavengers, thermal-crosslinking catalysts, slip additives, polymerization inhibitors, defoamers, emulsifiers, devolatilizers, wetting agents, dispersants, adhesion promoters, flow control agents, film-forming auxiliaries, rheology control additives (thickeners), flame retardants, siccatives, antiskinning agents, other corrosion inhibitors, or waxes and matting agents. Additives of this kind are disclosed for example in "Lackadditive" [Additives for coatings], edited by Johan Bieleman, Wiley-VCH, Weinheim, N.Y., 1998, or DE-A 199 14 896, column 13 line 516 to column 15 line 54.

Production of the Preparation

The preparation of the invention can be produced by intensely mixing all of the components of the preparation. Suitable mixing or dispersing assemblies are known to the skilled worker.

In one preferred embodiment of the invention it is possible first to prepare a dispersion from the binder system (A), the copolymer (B), and at least part of the solvent (C). Where the binder (A) is a primary dispersion, the binder is of course in predispersed form. Where the binder is present as solid, a solution or a secondary dispersion is prepared first of all. The copolymer (B) is likewise employed preferably in dispersion, emulsion or solution in a solvent. It is advantageous for this purpose to use the solutions or emulsions of the copolymers (B) that are obtained during the preparation of the copolymers (B), without the copolymers additionally being isolated beforehand.

The components (D) and any further components (E) may subsequently be dissolved or dispersed in the initial dispersion.

Implementation of the Method

The preparation of the invention is used for applying corrosion control coats to metallic surfaces. The coatings in question may be all kinds of corrosion control coatings, such as primer coatings (I), intermediate coatings (II), and top coatings (III). The corrosion control coatings in question may of course be coatings which combine the properties of at least two of these coats, or of all three coats, and so contribute to a simplified coat system. The coating in question may also be a shop coating. The skilled person understands a shop coating to be a coat that can be applied to freshly blasted steel in order to ensure corrosion control during the manufacture of steel components—thus, for example during the welding together of parts.

The method of the invention may serve for OEM protection or else for renovation.

As a general rule it is advisable to prepare the metallic surface for the execution of the method of the invention in a step (0), although this is not absolutely necessary in every case. By surface preparation for the execution of corrosion control measures, the skilled worker understands the cleaning of the surface to remove all contaminants and also the establishment of a surface roughness appropriate to the corrosion control measure. Examples of cleaning methods comprise cleaning with water or solvents, pickling with appropriate formulations, or high-pressure cleaning. Examples of further measures comprise abrasion and, in particular, blasting of the surface, sandblasting for example, and also flame blasting as well. In such operations it is possible for all of the adhering coats to be removed, down to the bright metal. It is, however, also possible, using less intensive methods, to remove only those coats whose adhesion is poor, while leaving intact coats on the surface. One possible technique for this purpose, is that known as sweep blasting.

To implement the method of the invention at least one corrosion control coat having a thickness of at least 15 μm is applied to the metallic surface, using the preparation described which can be crosslinked under atmospheric conditions.

This corrosion control coat may be applied directly to the bright metallic surface or else to a surface which has already been precoated with a corrosion control coat.

The at least one corrosion control coat is preferably a priming coat (I), which is applied either directly to the bright metal or to a metal surface bearing a shop coating. The shop coating optionally present may likewise be obtained with the formulation of the invention or else by means of a different formulation.

Application can be carried out using the customary techniques known to the skilled worker. The preparation is preferably applied by brushing or spraying.

Following its application to the surface, the applied coating cures in step (2) of the method under atmospheric conditions. At its most simple this can be accomplished by the gradual evaporation of the solvent. Depending on the nature of the binder employed, other crosslinking processes may also run their course. Details of this have already been presented above.

Depending on the thickness of the desired corrosion control coat, the entire coat can be applied in a single operation, or else two or more coats of equal kind can be applied in succession and cured in each case, in order to achieve the desired total thickness of the corrosion control coat.

Atop the primer coat (I) it is possible for further corrosion control coats to be applied. The nature and number of the further coats are determined by the skilled worker. In particular the primer coat (I) can be provided in further operations with an intermediate coat (II) and with a topcoat (III). For this purpose it is possible in principle to use arbitrary coating systems, provided that no unwanted effects arise in combination with the primer coat (I). The copolymer (B) used in accordance with the invention improves the adhesion of further coats to the primer coat. With advantage it is possible to use preparations of the invention for the primer coat (I), for the intermediate coat (II) and also for the topcoat.

In a further, preferred embodiment of the method first of all an integrated primer coat (Ia) is applied which can be overcoated directly with a topcoat material (III). An integrated primer coat thus combines the properties of the primer coat (I) and the intermediate coat (III).

In a further, preferred embodiment of the invention only a single integrated corrosion control coat (Ib) is applied, which requires no overcoating. An integrated corrosion control coat therefore combines the properties of all three coats.

The thickness of the cured, at least one corrosion control coat in accordance with the invention is at least 15 µm, preferably at least 25 µm, more preferably at least 40 µm, very particularly preferably at least 60 µm, and, for example, at least 100 µm. It is set by the skilled worker in accordance with the desired properties and end use of the coat.

Shop coatings are typically thin, 15 to 25 µm for example. The thickness of corrosion control coats which are not shop coats is generally at least 25 µm, preferably at least 40 µm, with particular preference at least 60 µm, and with very particular preference at least 100 µm.

The upper limit on the overall coat thickness, i.e., the thickness of all applied corrosion control coats together, is 2 mm, preferably less than 1.5 mm, more preferably less than 1 mm, very preferably less than 800 µm, and in particular less than 500 µm.

The examples which follow are intended to illustrate the invention.

Part A—Synthesis of Copolymers Used
Copolymer A

Copolymer of MAn/$C_{12}$ olefin (Molar Ratio 1/1)

A 2 l pilot-scale stirrer is charged with 176.4 g (1.05 mol) of n-dodecen-1-ene, gassed with nitrogen, and heated to 150° C. Over the course of 6 h a feed stream 1 of 147.1 g of melted maleic anhydride (80° C., 1.50 mol) and a feed stream 2 of 4.1 g of di-tert-butyl peroxide (1% based on, monomers) 75.6 g (0.45 mol) of n-dodecen-1-ene are added dropwise. The reaction mixture is stirred at 150° C. for a further 2 h. This gives a pale yellowish, solid resin.

In a second method step the MAn units incorporated into the copolymer are hydrolytically opened.

For this purpose, in a 1 l round-bottomed flask, 124.9 g of the copolymer obtained as described are comminuted, suspended in 332 g of water and heated to 100° C. Over the course of an hour 41.7 g of dimethylethanolamine are added dropwise and the mixture is stirred at 100° C. for a further 6 h. This gives a solution having a solids content of 25.8%.

Copolymer B

Copolymer of MAn/$C_{12}$ Olefin/Polyisobutene 1000 (Molar Ratio 1/0.8/0.2)

In a 2 l pilot-scale stirrer with anchor stirrer and internal thermometer 600.0 g (0.6 mol) of high-reactivity polyisobutene (α-olefin content>80%) having an Mn of 1000 g/mol (Glissopal® 1000, BASF) and 322.5 g (1.92 mol) of $C_{12}$ olefin are heated to 150° C. with stirring and introduction of nitrogen. Subsequently, over the course of 6 h, a feed stream 1, consisting of 294.0 g of maleic anhydride (80° C., 3.0 mol), and feed stream 2, consisting of 13.0 g of di-tert-butyl peroxide (1% based on monomers) and 80.6 g (0.48 mol) of $C_{12}$ olefin, are metered in. After the end of feed streams 1 and 2 the batch is stirred at 150° C. for a further 2 h. This gives a solid yellowish polymer.

For the hydrolytic opening of the MAn units, 150 g of the copolymer obtained as described are comminuted, suspended in 400 g of water and heated to 100° C. Over the course of an hour 30.9 g of dimethylethanolamine are added dropwise and the mixture is stirred at 100° C. for a further 6 h. This gives a solution having a solids content of 26.8%.

The K value of the copolymer B is 22.6 (determined by the method of H. Fikentscher, Cellulose-Chemie, vol. 13, pp. 58-64 and 71-74 (1932) in 1% by weight strength solution at 25° C. and uncorrected pH).

Part B—Performance Testing

Performance testing was carried out using a corrosion control formulation based on a commercial aqueous styrene-acrylate dispersion for paints (Acronal® Optive 410, BASF Corp.). The dispersion used has the following properties:

| | |
|---|---|
| Solids content | 49-51% |
| pH | 7.5-8.5 |
| Brookfield viscosity | 500-1000 cps |
| Density | 1.06 g/cm$^3$ |
| MFFT (Minimum Film Forming Temperature (to ASTM D 2354)) | about 12° C. |
| Particle size | about 110 nm |

To prepare the formulations of the invention, 3% by weight of each of copolymers A or B was added to the stated styrene-acrylate dispersion (calculated as solid copolymer based on the solids fraction of the dispersion). This was done using the above-described aqueous emulsions of the copolymers A and B respectively. For comparison purposes, 3% by weight of a commercially customary styrene-acrylic acid copolymer was added to a further sample of the dispersion. Additionally, a further sample was prepared without addition of a polymeric corrosion inhibitor. The dispersions employed are summarized in table 1.

TABLE 1

Dispersions used for preparing coating materials

| No. | Corrosion control polymer employed |
|---|---|
| Inventive example 1 | Copolymer A (MAn/$C_{12}$ olefin (1/1)) |
| Inventive example 2 | Copolymer B (MAn/$C_{12}$ olefin/polyisobutene 1000 (1/0.8/0.2)) |
| Comparative example 1 | — |
| Comparative example 2 | Styrene-acrylic acid copolymer (about 35 mol % acrylic acid), $M_w$ 4700 g/mol |

Guideline Formulation for Corrosion Control Primers

Using the resultant aqueous dispersions of styrene-acrylate copolymers with and without addition of corrosion control polymers, preparations were produced in accordance with the following instructions:

393.4 g of the respective aqueous polymer dispersion are admixed with 2.2 g of a commercial defoamer for coating materials (mixture of polysiloxanes and hydrophobic solids in polyglycol; BYK® 022, Byk), after which a mixture consisting of 0.6 g of an anionic dispersant (acidic phosphoric ester of a fatty alcohol alkoxylate; Lutensit® A-EP, BASF AG), 11.0 g of concentrated ammonia, and 58.6 g of water are added by means of a Dispermat. Incorporated additionally, with stirring, is a mixture of 7.2 g of phenoxypropanol (film-forming assistant) and 7.2 g of benzine 180-210° C. (film-forming assistant).

Added subsequently are 85.0 g of a hematite pigment (Bayferrox® 130 M, Lanxess), 82.1 g of an anticorrosion pigment based on zinc phosphate (Heucoprhos® ZPZ from a modified zinc phosphate, Heubach), 36.0 g of magnesium silicate (filler; talc 20 M 2, Luzenac), and 127.8 g of a filler based on barium sulfate and zinc sulfide (30% by weight ZnS) (Litopone® L). The Whole mixture is dispersed with glass beads (ø 3 mm) for at least 30 minutes.

Thereafter, with further stirring, a further 166.4 g of polymer dispersion, 1.9 g of BYK® 022, and 3.7 g of a 1:1 mixture of water and a commercial corrosion inhibitor (corrosion inhibitor L 1, Erblöh) are added and the glass beads are removed by sieving. To finish, the batch is admixed with a mixture of 3.7 g of a 25% strength solution of a commercial, urethane-based thickener (Collacral PU 85, BASF AG) and 13.2 g of butyl glycol (solvent) and also, if appropriate, the pH is adjusted to approximately 9.5 using concentrated ammonia. This gives 1000 g of a corrosion control primer with a solids content of 61% and a pigment/volume concentration (PVC) of 23%.

Application of the Formulations to Steel Panels, Preparation for the Salt Spray Test The primers under test were diluted with fully demineralized water to the desired viscosity (300 to 1000 mPas (ICI Rotothinner sphere)) and drawn down using a box-section doctor blade onto a cleaned, non-galvanized steel panel (200× 80×0.9 mm); the slot size is selected so as to give a dry-film thickness of 60-85 µm.

After six days of drying at room temperature and one day of thermal conditioning at 50° C.; the reverse side of the test panel was coated with a solvent-based coating material, for protection from corrosion, and the edges were masked off with tesafilm tape.

To end with, the metal test panel was inscribed down to the substrate, using a scorer, on the side coated with the primer under test.

Salt Spray Test/Evaluation

Using the test panels, a salt spray test was conducted in accordance with DIN EN ISO 7253 (duration of test: 240 h).
For the Evaluation of the Corrosion Behavior:
Surface Corrosion Proportion of the surface area corroded in relation to the total surface area of the metal test panel, in [%]
Cross-Cut (In Accordance with DIN EN ISO 2409)

The cross-cut test is used to determine the adhesion of the coating to the substrate. For this purpose a lattice comprising a number of cuts (at a linear distance of 2 mm) is incised into the coating after the salt spray test, the lattice is overstuck with adhesive tape, and then the adhesive tape is removed. An evaluation is made of the appearance of the lattice after the tape has been removed. Scores of 0 to 5 are awarded, in accordance with the following scale:

| | |
|---|---|
| GT 0 | The cut edges are completely smooth and none of the squares of the lattice has undergone delamination. |
| GT 1 | The coating has undergone a delamination along the cut edges, but the delaminated area is not substantially greater than 15% of the cross-cut area. |
| GT 2 | The delaminated lattice area is significantly greater than 15% but not substantially greater than 35%. |
| GT 3 | The coating has undergone partial or full delamination in broad strips along the cut edges, or some squares have undergone partial or complete delamination. |
| GT 4 | The cross-cut area affected, however, is not substantially greater than 65%. |
| GT 5 | Any delamination that can be classified as more severe than GT 4. |

The test was carried out once directly after the salt spray test and then a second time after the metal test panel had dried for one day.

The results of the tests are compiled in table 2.

Photographs of the sample surface are collected in FIG. 1.

The data in table 1 and also FIG. 1 show that the corrosion is significantly inhibited by the copolymers (B) used in accordance with the invention, not only in comparison to a sample without polymeric corrosion inhibitors but also in comparison to a copolymer of acrylic acid and styrene. Whereas for the comparison sample without corrosion inhibitor about 90% of the surface, and for the second comparative sample, with a styrene-acrylic acid copolymer, about 60% of the surface has undergone corrosion, the figure for the inventive examples is only 5% to 15% of the surface. The copolymers used in accordance with the invention are especially advantageous for corrosion control coatings.

TABLE 2

Compilation of the results in the salt spray test

| | Inventive example 1 | Inventive example 2 | Comparative example 1 | Comparative example 2 |
|---|---|---|---|---|
| Polymeric corrosion inhibitor | Copolymer A MAn/$C_{12}$ olefin copolymer (1/1) | Copolymer B MAn/$C_{12}$ olefin/ PIB1000 (1/0.8/0.2) | None | Acrylic acid-styrene copolymer |
| pH of formulation | 9.3 | 9.2 | 9.6 | 9.6 |
| Coat thickness [µm] | 65 to 82 | 67 to 77 | 66 to 84 | 76 to 89 |
| Surface corrosion | about 5% | about 15% | about 90% | about 60% |
| Cross-cut following test after re-drying | 0-2<br>0-2 | 1-2<br>0-2 | 5<br>0-2 | 0-2<br>0-2 |

The invention claimed is:

1. A preparation for applying a corrosion control coat to a metallic surface, comprising the following components:
   (A) 15% to 70% by weight of at least one binder system (A) curable under atmospheric conditions,
   (B) 0.1% to 40% by weight of at least one polymeric corrosion preventative,
   (C) 5% to 83.9% by weight of at least one solvent,
   (D) 1% to 70% by weight of at least one component (D) selected from the group consisting of finely divided fillers, pigments and dyes,
   the amounts each being based on the total amount of the preparation,
   wherein the at least one binder system is selected from the group consisting of aqueous or predominantly aqueous dispersions of polyacrylates and styrene-acrylate copolymers (A1), styrene-alkadiene polymers (A2), polyurethanes (A3), alkyd resins (A4), and combinations thereof,
   wherein the corrosion preventative is at least one copolymer (B) synthesized from the following monomeric structural units:
   (b1) 70 to 30 mol % of at least one monoethylenically unsaturated hydrocarbon (b1a) having 9 to 27 C atoms and, optionally, at least one monomer (b1b) selected from the group consisting of monoethylenically unsaturated hydrocarbons (b1b'), modified with functional groups $X^1$, and vinyl ethers (b1b"), wherein functional group $X^1$ is selected from the from the group consisting of —Si(OR$^5$)$_5$—OR$^6$, —SR$^6$, —NR$^6_2$, —NH(C=O)R$^6$, COOR$^6$, —(C=O)R$^6$, —COCH$_2$COOR$^6$, —(C=NR$^6$)R$^6$, —(C=N—NR$^6_2$)R$^6$, —(C=N—NR$^6$—(C=O)—NR$^6_2$)R$^6$, —(C=N—OR$^6$)R$^6$, —O—(C=O)NR$^6$, —NR$^6$(C=O)NR$^6_2$, —NR$^6$(C=NR$^6$)NR$^6$, —CSNR$^6_2$, —CN, —PO$_2$R$^6_2$, —PO$_3$R$^6_2$, and —OPO$_3$R$^6_2$, $R^5$=C$_1$ to C$_6$ alkyl;

$R^6$=independently at each occurrence H, C$_1$ to C$_6$ alkyl, aryl, alkali(ne earth) metal salt) or —SO$_3$H;

(b2) 30 to 70 mol % of at least one monoethylenically unsaturated dicarboxylic acid having 4 to 8 C atoms and/or its anhydride (b2a) and/or derivatives (b2b) thereof, the derivatives (b2b) being esters of the dicarboxylic acid with alcohols of the general formula HO—R$^1$—X$^2_n$ (I) and/or amides or imides with ammonia and/or amines of the general formula HR$^2$N—R$^1$—X$^2_n$ (II), and the abbreviations having the following definition:

$R^1$: (n+1)-valent hydrocarbon group having 1 to 40 C atoms, in which nonadjacent C atoms may also be substituted by O and/or N, $R^2$: H, C$_1$ to C$_{10}$ hydrocarbon group or —(R$^1$—X$^2_n$)

n: 1, 2 or 3

$X^2$: a functional group selected from the group consisting of —Si(OR$^3$)$_3$, —OR$^4$, —SR$^4$, —COOR$^4$, —(C=O)R$^4$, —COCH$_2$COOR$^4$, —CSNH$_2$, —CN, —PO$_2$R$^4_2$, —PO$_3$R$^4_2$, —OPO$_3$R$^4_2$, and —SO$_3$H;

$R^3$: C$_1$ to C$_6$ alkyl;

$R^4$: H, C$_1$ to C$_6$ alkyl, aryl:

and also (b3) 0 to 10 mol % of other ethylenically unsaturated monomers, different from (b1) and (b2) but copolymerizable with (b1) and (b2), the amounts each being based on the total amount of all the monomer units in the copolymer.

2. The preparation according to claim 1, wherein monomer (b2a) is maleic acid and/or maleic anhydride.

3. The preparation according to claim 1, wherein monomers (b1a) are monoethylenically unsaturated hydrocarbons having 12 to 24 C atoms.

4. The preparation according to claim 1, wherein the copolymer further comprises 1 to 60 mol %, based on the amount of all monomers (b1), of at least one reactive polyisobutene.

5. The preparation according to claim 1, wherein the functional group $X^2$ is selected from the group consisting of —OH, —SH, —COOH, —CSNH$_2$, —CN, —PO$_3$H$_2$, and —SO$_3$H, and salts thereof.

6. The preparation according to claim 1, wherein the amount of components (D) is 10% to 50% by weight.

7. The preparation according to claim 1, wherein the preparation is chromium-free.

8. The preparation according to claim 1, wherein the binder system is an aqueous or predominantly aqueous dispersion of polyacrylates.

9. The preparation according to claim 1, wherein the binder system is an aqueous or predominantly aqueous dispersion of styrene-acrylate copolymers.

10. The preparation according to claim 1, wherein the binder system is an aqueous or predominantly aqueous dispersion of styrene-butadiene copolymers.

11. A method of corrosion control through application of at least one corrosion control coat having a thickness of at least 15 μm to a metallic surface, comprising:
(1) applying a preparation curable under atmospheric conditions to the metallic surface, and
(2) curing the applied coat under atmospheric conditions, wherein the preparation curable under atmospheric conditions is the preparation according to claim 1.

12. The method according to claim 11, wherein the metallic surface is the surface of steel, zinc or zinc alloys, aluminum or aluminum alloys.

13. The method according to claim 11, wherein the thickness of the cured coat is at least 25 μm.

14. The method according to claim 11, wherein the metallic surface prior to coating with the preparation is cleaned in an additional preparation step (0).

15. The method according to claim 11, wherein the corrosion control coat is a priming coat (I) which is applied to the bright metal surface.

16. The method according to claim 15, wherein the priming coat (I) is overcoated in further steps with an intermediate coating (II) and also with a topcoat (III).

17. The method according to claim 15, wherein the corrosion control coat is an integrated priming coat (Ia) which is overcoated in a further step directly with a topcoat (III).

18. The method according to claim 15, wherein the corrosion control coat is an integrated corrosion control coat (Ib) which is not overcoated any more.

19. A coated metallic surface obtainable by means of a method according to claim 11.

20. A metallic structure or a metal construction coated by the at least one corrosion control coat according to claim 11.

21. The coated metallic structure or metal construction according to claim 20, wherein the metallic structure or metal construction is selected from the group consisting of bridges, power masts, tanks, containers, chemical plants, buildings, roofs, pipes, couplings, flanges, ships, cranes, posts, and bulkheads.

22. The coated metallic surface according to claim 19, which is exposed at least to category C2 corrosion in accordance with DIN EN ISO 12944.

* * * * *

UNITED STATES PATENT AND TRADEMARK OFFICE
CERTIFICATE OF CORRECTION

PATENT NO. : 8,563,128 B2             Page 1 of 1
APPLICATION NO. : 11/814758
DATED : October 22, 2013
INVENTOR(S) : Göthlich et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1354 days.

Signed and Sealed this

Fifteenth Day of September, 2015

Michelle K. Lee
*Director of the United States Patent and Trademark Office*